United States Patent
Peddinghaus

[15] 3,684,269
[45] Aug. 15, 1972

[54] LOAD-BEARING SPRING LEG

[72] Inventor: Carl Ullrich Peddinghaus, Obere Lichtenplatzer, St. 276, Wuppertal-Barmen, Germany

[22] Filed: July 24, 1970

[21] Appl. No.: 58,057

[30] Foreign Application Priority Data

July 25, 1969  Germany..........P 19 37 739.0

[52] U.S. Cl. ..................................................267/64
[51] Int. Cl. .................................................F16f 9/06
[58] Field of Search..........................................267/64

[56] References Cited

UNITED STATES PATENTS

| | | | |
|---|---|---|---|
| 3,165,176 | 1/1965 | Avner | 267/64 R |
| 3,381,952 | 5/1968 | Stubblefield | 267/64 R |

*Primary Examiner*—James B. Marbert
*Attorney*—Holman & Stern

[57] ABSTRACT

A load bearing spring leg which comprises a spring element and a piston and cylinder shock absorber unit wherein the piston of said unit is connected to three piston rods which are equi-angularly spaced around the axis of the cylinder of said unit and which each extend in sealing manner from one end of said cylinder.

6 Claims, 2 Drawing Figures

PATENTED AUG 15 1972
3,684,269
FIG. 1
FIG. 2
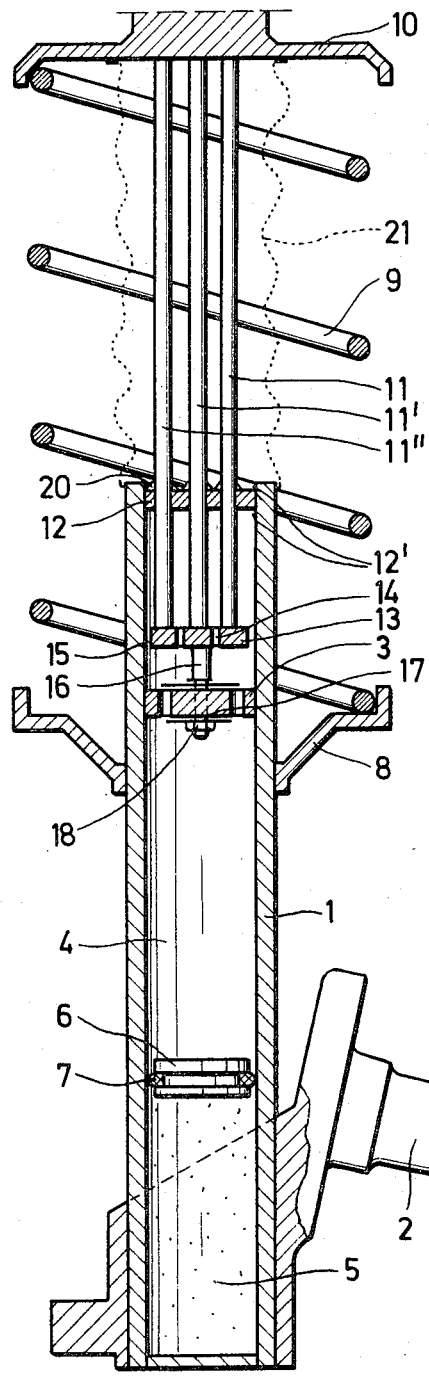
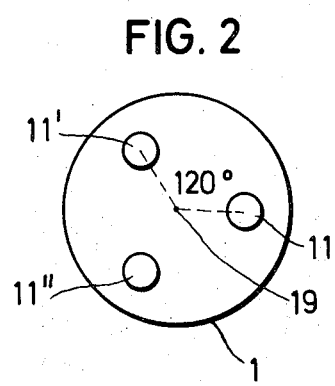
INVENTOR
Carl Ullrich Peddinghaus.
BY Holman & Stern
ATTORNEYS

LOAD-BEARING SPRING LEG

The invention relates to a load-bearing spring leg comprising a spring element bearing the supporting force and a tubular shock absorber in which is displaceable a piston equipped with passage openings.

Considerable buckling stresses, to withstand which it has already been attempted by appropriate dimensioning of the piston rod of the shock absorber, can arise during operation in spring legs of this kind. The system as a whole becomes relatively massive thereby so that the requirement referred to can no longer be fulfilled except at very great expense, above all in the case of greater piston strokes. Beside this, it is known that the piston rod requires particularly careful surface machining and surface processing, for which the degree of difficulty increases considerably with the diameter. For example, it is very difficult in chromium electroplating to apply an uniform chromium layer with greater diameters of the piston rod. Further difficulties arise for the sealing of the piston rod at its point of egress from the cylinder. The sealing rings or other sealing means endowed with corresponding diameters require considerable expenditure for their insertion. Finally, just in the case of the load-bearing spring legs, relatively substantial stresses arise transversely to the axial direction, so that a corresponding dimensioning of the piston rod is also advisable in the interest of a reduction in pressure per unit of area. Finally, difficulties arise moreover in the application of modern hydropneumatic shock absorbers inasmuch as the area of action for the gas pressure of the shock absorber increases as the thickness of the piston rod increases. This results in considerably increased squeezing-out forces, so that a shock absorber of this kind either works too hard at the usual high pressure of its gas volume and lifts the object supported by the spring element unacceptably high or must be operated at a substantially lower gas pressure, in doing which it is known however that preferential cavitational actions of the damping fluid and undesirable gas releases from the same, can occur. The consequence thereof then is an unfavorable influence on the damping characteristic of the shock absorber. This is enhanced moreover by the fact that a considerable displacement of volume and thus corresponding movement of the damping fluid occurs as a result of the thick piston rod. If no devices are incorporated to act against intermixing between the liquid phase and the gas phase, their intermixing is promoted thereby, or if conventional means for example such as separating pistons or the like are employed to prevent intermixing, the wear on the seals of these devices which must perform a stroke corresponding to the volume of the displaced damping liquid becomes substantially greater so that they finally no longer allow of any reliable separation of the liquid phase from the gas phase.

For partial prevention of these shortcomings, load-bearing spring legs comprising a telescopically extensible tubular system are also known, the inner tube being formed by a conventional shock absorber whereof the piston rod is coupled at one end with the outer tube which is guided on the inner tube. The piston rod is concomitantly relieved of buckling stress by the telescoping tubular system, the tubular system inclusive of its guides, however requires a considerable additional expenditure on materials and machining costs.

This invention is based on the problem of improving a load-bearing spring leg of the kind described in the foregoing, in such manner that all the aforesaid shortcomings are eliminated thereby. According to the invention there is provided a load bearing spring leg comprising a spring element and a piston and cylinder shock absorber in which the piston is provided with valve means permitting flow of fluid through the piston on displacement of the piston relative to the cylinder, characterized in that said piston is connected to three piston rods which are equi-angularly spaced around the axis of said cylinder and which each extend in sealing manner out of one end of said cylinder. In this way, the existing central piston rod is replaced by a system of piston rods in which the mechanical strength of the existing piston rods, that is the buckling strength in particular, is retained in identical manner or is even better, whereas the total cross-sectional area is substantially smaller since it is possible to employ relatively thin piston rods. These can be manufactured economically by mass-production, which is of importance in particular in respect of their surface machining and surface processing. Passage in sealed manner through the end of the shock absorber cylinder is then relatively uncomplicated, while securing very low pressures per unit of area. The shock absorber thereby also becomes substantially lighter, it being advantageous in this connection that a relatively great cross-sectional area can be chosen for the shock absorber cylinder. This allows of the application of a damping piston of correspondingly large area with appropriate throughflow for the damping liquid, a very soft damping action being attainable thereby. Even at the customary and even higher pressures of the gas volumes incorporated in the hydropneumatic shock absorber, the squeezing-out forces remain small so that the shock absorber of the spring leg can perform its actual function without troublesome secondary phenomena. The increase in cross-section of the spring leg as present in a telescoping tubular system owing to the additional outer tube and frequently undesirable for reasons of space, is concomitantly eschewed.

The extremities of the piston rod situated outside the shock absorber cylinder may, according to method of fastening, be joined direct to the object to be supported or advantageously also corresponding to their mutual spacing, to a fastening element.

To act against an undesirable torsional stress, the end of the shock absorber cylinder corresponding to the piston rods serves also as a bushing which is non-displaceable in axial direction but angularly movable around its axis relative to the shock absorber cylinder and having openings corresponding to the piston rods.

In preferring form of embodiment, the shock absorber cylinder has the piston stroke space filled in manner known per se with damping liquid and moreover with a volume of pressurized gas. Between the damping liquid and the pressurized gas volume may be arranged in manner known per se a device acting against the intermixing of these two phases, which may be a separating piston for example. Since considerably less damping liquid is displaced by the piston rod system reduced substantially in overall cross-section, the separating piston which may be incorporated for example, need perform no more than very short strokes, so that the durability of its seals is extended substantially. Moreover, thanks to the lesser displacement of the damping liquid, a lesser pressure rise results moreover in the gas volume, so that the shock absorber operates more evenly.

In principle, the new spring leg can be employed in any position desired. In particular, the form of embodiment proposed renders it possible to employ the shock absorber therein with the piston rods pointing upwards. Substantially better load conditions are obtained thereby in numerous cases of application.

To be able to employ a conventional shock absorber piston, the piston rods have their piston-end extremities appropriately secured in a fastening plate which allows of traversal by the damping liquid and which has a central supporting post employed for actual piston fastening and extending in the direction of the piston.

The radial distance of the piston rods from the axis of the shock absorber cylinder is chosen in such manner as to result in the load-bearing capacity intended in the individual case, in particular the buckling strength, the individual cross-sections having to be considered in customary manner. The calculation is concomitantly made with the aid of the known formulas for the determination of the buckling and bending strength.

For the application of the new spring leg schedule in motor vehicle construction in particular, it is of advantage with an internal diameter of the shock absorber cylinder of approximately 46 mms and a pressure of the gas volume of approximately 30 atmospheres, to employ individual diameters of approximately 6 mms for each of the three piston rods, these having their centers concomitantly spaced approximately 12 mms from the center of the cross-section of the shock absorber cylinder.

To prevent the entry of impurities into the piston rod seals, scraping seals can be situated in front of their entry in the shock absorber cylinder. An anti-dust bellows enveloping all piston rods may equally be employed.

The drawings relating to an example of embodiment serve the purpose of illustrating the invention. In these:

FIG. 1 shows the new spring leg in cross-section, whereas

FIG. 2 reproduces a plan view of the diagrammatically shown piston rod arrangement.

The form of embodiment illustrated in FIG. 1 represents a front axle spring leg specified for motor vehicle construction. The shock absorber cylinder 1 to the bottom extremity of which is fastened the stub axle 2, is recognizable. In the shock absorber cylinder 1 is displaceable a piston 3 contrived in manner known per se with throughflow openings for fluid as well as with valve discs. Within the stroke space of the piston 3 is present the damping liquid 4 which is separated in this case from the pressurized gas volume 5 by a so-called separating piston 6 with peripheral seals 7.

The shock absorber cylinder 1 moreover comprises a plate 8 on which is borne the spring 9 which, as a spring element, bears the supporting force. The spring 9 extends up to the upper plate 10 which is joined to the vehicle chassis in direct or indirect manner.

The upper plate 10 also serves as a fastening element for three piston rods 11,11' and 11''. The latter extend through one end of the shock absorber cylinder 1 in the area of the bushing 12 in which are also inset seals which are known per se and not illustrated in detail in the drawings, for said piston rods. The bushing 11 is secured against axial displacement by securing rings 12' or the like, but is capable of angular movement so that no torsional strains can intervene. One set of extremities of the piston rods are held in the fastening plate 13. The latter allows the damping liquid to pass through openings 14 and a gap 15 from the rim or else through a pattern of overall star-shaped cross-section. The fastening plate 13 is equipped moreover with a supporting post 16 which, for its part, has a stepped-down portion 17 and secures the piston 3 by means of the piston nut 18.

FIG. 2 shows the three piston rods 11, 11' and 11'' in diagrammatical plan view. Recognizable are the periphery of the shock absorber cylinder 1 as well as the center 19 of its cross-section. Relative to the latter, the three piston rods have their centers arranged at angles of 120° from each other in each case.

The Scraping seals 20 arranged in front of the entry of the piston rods 11,11' and 11'' into the shock absorber cylinder 1, are seen in FIG. 1. Instead of these or to complement these, it is also possible moreover to employ an anti-dustbellows 21 which extends between the fastening element 10 and the upper rim of the shock absorber cylinder 1.

Having thus described my invention what I claim as new and desire to secure by Letters Patent is:

1. A load-bearing spring leg comprising a spring element and a piston and cylinder shock absorber in which the piston is provided with valve means permitting flow of fluid through the piston on displacement of the piston relative to the cylinder, characterized in that said piston is connected to three piston rods which are equi-angularly spaced around the axis of said cylinder and which each extend in sealing manner out of one end of said cylinder.

2. A load bearing spring leg as claimed in claim 1, characterized in that said piston rods are connected to a fastening element outside said shock absorber cylinder.

3. A load bearing spring leg as claimed in claim 1, characterized in that there is provided at one end of said shock absorber cylinder a bushing which is non-displaceable axially but which is angularly movable relative to said shock absorber cylinder around the axis thereof, said bushing having openings through which said piston rods extend.

4. A load bearing spring leg as claimed in claim 1, characterized in that said shock absorber is arranged so that said piston rods extend upwardly from the upper end of said cylinder.

5. A load bearing spring leg as claimed in claim 1, characterized in that there is provided in said shock absorber cylinder an apertured fastening plate to which said piston rods are fastened and through which fluid can flow, said fastening plate having an axially extending central supporting post to which said piston is secured.

6. A load bearing spring leg as claimed in claim 3, characterized in that there are provided scraper seals for said piston rods, said scraper seals being disposed on the exterior of said bushing.

* * * * *